(12) United States Patent
Jeffrey et al.

(10) Patent No.: US 7,346,220 B2
(45) Date of Patent: Mar. 18, 2008

(54) METHOD AND APPARATUS FOR REDUCING THE BANDWIDTH REQUIRED TO TRANSMIT IMAGE DATA

(75) Inventors: Eric Jeffrey, Richmond (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 769 days.

(21) Appl. No.: 10/625,753

(22) Filed: Jul. 23, 2003

(65) Prior Publication Data
US 2005/0018910 A1    Jan. 27, 2005

(51) Int. Cl.
*G06K 9/36*    (2006.01)

(52) U.S. Cl. .................. 382/248; 382/244; 382/232

(58) Field of Classification Search ............... 382/232, 382/244, 248; 348/742, 791, 761, 762, 578, 348/581, 585, 595; 353/98; 345/589, 629, 345/594, 600; 715/771, 723, 500.1, 765
See application file for complete search history.

(56) References Cited

U.S. PATENT DOCUMENTS

| | | | | |
|---|---|---|---|---|
| 5,193,003 | A | 3/1993 | Kondo | 375/240.12 |
| 5,227,863 | A * | 7/1993 | Bilbrey et al. | 348/578 |
| 5,237,646 | A | 8/1993 | Bunce | 358/1.18 |
| 5,359,694 | A | 10/1994 | Concordel | 358/445 |
| 5,543,823 | A | 8/1996 | Kurisu | 345/560 |
| 5,671,440 | A | 9/1997 | Curry | 345/656 |
| 5,754,710 | A | 5/1998 | Sekine et al. | 382/300 |
| 5,801,776 | A | 9/1998 | Tamura et al. | 375/240.18 |
| 5,806,072 | A | 9/1998 | Kuba et al. | 707/200 |
| 5,809,174 | A * | 9/1998 | Purcell et al. | 382/236 |
| 5,977,947 | A | 11/1999 | Potu | 345/660 |
| 6,002,411 | A | 12/1999 | Dye | 345/542 |
| 6,067,098 | A | 5/2000 | Dye | |
| 6,151,074 | A | 11/2000 | Werner | 348/425.1 |
| 6,212,300 | B1 | 4/2001 | Rengakuji | 582/232 |
| 6,263,119 | B1 | 7/2001 | Martucci | 382/298 |
| 6,333,951 | B1 | 12/2001 | Tamura et al. | 375/240.25 |
| 6,348,925 | B1 | 2/2002 | Potu | 345/537 |
| 6,559,826 | B1 | 5/2003 | Mendelson et al. | |
| 6,573,901 | B1 | 6/2003 | Rai | 345/547 |
| 6,624,828 | B1 * | 9/2003 | Dresevic et al. | 715/771 |
| 6,931,069 | B2 | 8/2005 | Hatano et al. | 375/240.24 |
| 7,136,193 | B2 | 11/2006 | Takata et al. | 358/1.9 |
| 7,202,917 | B2 * | 4/2007 | Katoh et al. | 348/742 |
| 2002/0085767 | A1 | 7/2002 | Epstein et al. | 382/246 |

(Continued)

FOREIGN PATENT DOCUMENTS

GB    2 345 400 A    7/2000

(Continued)

*Primary Examiner*—Anh Hong Do
(74) *Attorney, Agent, or Firm*—Mark P. Watson (57) ABSTRACT

The invention is directed to a method and apparatus for reducing the bandwidth required to transmit image data to a display device. It is contemplated that the image data represents a plurality of pixels defining an image for display on the display device, and that the image data is transmitted in a data stream with the data being in a predetermined order of pixel components. The method comprises the steps of receiving the image data from the data stream, and transforming the image data as it is received by selectively storing some of the image data in a memory for access by the display device and discarding other of the image data.

24 Claims, 8 Drawing Sheets

U.S. PATENT DOCUMENTS

| | | |
|---|---|---|
| 2002/0131084 A1 | 9/2002 | Andrew et al. ............ 358/1.16 |
| 2002/0135585 A1 | 9/2002 | Dye et al. .................. 345/531 |
| 2002/0180744 A1 | 12/2002 | Takala et al. ............... 345/545 |
| 2003/0048951 A1 | 3/2003 | Rengakuji et al. .......... 382/232 |
| 2003/0117513 A1 | 6/2003 | Anderson ............. 348/333.11 |
| 2005/0001857 A1 | 1/2005 | Nakakita et al. |
| 2005/0063597 A1 | 3/2005 | Mao et al. ................. 382/232 |
| 2005/0286775 A1 | 12/2005 | Jeffrey et al. ............... 382/232 |

FOREIGN PATENT DOCUMENTS

| | | |
|---|---|---|
| JP | 2002135596 | 5/2002 |
| JP | 2004165733 | 6/2004 |
| WO | 0191039 | 11/2001 |

* cited by examiner

(PRIOR ART)

FIG. 3

(PRIOR ART)

FIG. 4

(PRIOR ART)

FIG. 5

(PRIOR ART)

(PRIOR ART)

METHOD AND APPARATUS FOR REDUCING THE BANDWIDTH REQUIRED TO TRANSMIT IMAGE DATA

FIELD OF THE INVENTION

The present invention relates generally to a method and apparatus for reducing the bandwidth required to transmit image data, and more particularly to a method and apparatus for reducing the bandwidth required to transmit JPEG decoded block-interleaved data.

BACKGROUND OF THE INVENTION

The term "computer system" today applies to a wide variety of devices. Mainframe computers, personal computers, personal digital assistants, and cellular telephones are but a few examples. In computer systems, a graphics controller ("GC") is commonly employed to couple a CPU to a display device, such as a CRT or an LCD. A GC is typically used to perform certain special purpose functions related to the display of text and images so that the CPU is not required to perform such functions. Commonly, a GC is capable of performing image transformation operations, such as cropping and scaling an image. In addition, a GC may have a data compressor/decompressor ("CODEC") for sending and receiving compressed data.

When image data is transmitted between computer systems, such as over the Internet, a large amount of transmission capacity or "bandwidth" is required. For this reason, the time required to transfer image data can be quite long. In addition, the transfer of image data creates congestion in the network, causing the transmission of other data to slow. One solution to this problem is to compress the data before transmitting it. A popular method for compressing still images was developed by the Joint Photographic Experts Group ("JPEG") and files compressed according to the method are referred to as "JPEG files" or as being in the "JPEG format." The JPEG standard includes variations and versions and, for ease of explanation, this acronym is used herein in a general sense to encompass all such variations and versions. Before it is compressed into a JPEG file, the image data must first be transformed and divided into groups or "blocks." In addition, the blocks of image data are arranged in an alternating or "interleaved" sequence before being compressed. When a computer system receives a JPEG file, it must decompress the file before it can be displayed. In addition, because the image data is in a block-interleaved sequence after decompression (referred to as "JPEG decoded block-interleaved data"), regrouping as well as transformation operations are required. In a computer system with a GC having a CODEC, the GC performs data compression and decompression, as well as the other required operations.

The compression of image data greatly improves the speed with which networks can transfer data. Moreover, the use of a GC to handle compression and decompression tasks frees the CPU to perform other work. When the image data is decompressed by the GC, however, the quantity of data increases dramatically. Further, the amount of bandwidth required to transfer image data between modules within a GC becomes very large. The decompressed image data is typically stored and read from a memory before it is displayed, and accordingly, these operations consume an amount of bandwidth that is substantial. Thus, the processing of decompressed image data imposes a significant load on the GC, which causes the power consumed by the GC to increase. In addition, the high memory bandwidth requirement creates a memory access bottleneck that makes memory access time for other devices lengthen. In particular, it inhibits the CPU's ability to access memory in a timely manner. A method or apparatus capable of reducing the amount of memory bandwidth a GC requires to transfer decompressed image data to and from memory would clearly be desirable.

Accordingly, there is a need for a method and apparatus for reducing the bandwidth required to transmit image data, and more particularly to a method and apparatus for reducing the bandwidth required to transmit JPEG decoded block interleaved data.

BRIEF SUMMARY OF THE INVENTION

The invention is directed to a method and apparatus for reducing the bandwidth required to transmit image data to a display device. It is contemplated that the image data represents a plurality of pixels defining an image for display on the display device, and that the image data is transmitted in a data stream with the data being in a predetermined order of pixel components. The method comprises the steps of receiving the image data from the data stream, and transforming the image data as it is received by selectively storing some of the image data in a memory for access by the display device and discarding other of the image data.

The objectives, features, and advantages of the invention will be more readily understood upon consideration of the following detailed description of the invention, taken in conjunction with the accompanying drawings.

DETAILED DESCRIPTION OF A PREFERRED EMBODIMENT

The invention is directed to a method and apparatus for reducing the bandwidth required to transmit image data, and more particularly to a method and apparatus for reducing the bandwidth required to transmit JPEG decoded block interleaved data. Reference will now be made in detail to the present preferred embodiments of the invention, examples of which are illustrated in the accompanying drawings. Wherever possible, the same reference numbers are used in the drawings and the description to refer to the same or like parts.

An image on a display device is formed from an array of small discrete elements known as "pixels." The attributes of each pixel, such as its brightness and color, are represented by a numeric value, which is typically represented in the binary form that computer systems require. Thus, an image can also be considered as an array of binary elements of data For convenience of explanation and in accordance with the use of the term in the art, the term "pixel" is used herein to refer at times to the display elements of a display device, at times to the binary elements of data that are stored and manipulated within a computer system and which define the attributes of such display elements, and at times to both, the appropriate sense of the term being clear from the context.

Figure 1:
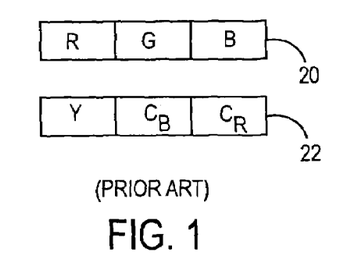
FIG. 1 is a block diagram of data words representing the attributes of a pixel.

FIG. 1 illustrates two 24-bit data words that may be used to numerically represent the attributes of a pixel. The data word 20 defines a pixel in terms of an RGB color model and the data word 22 defines a pixel using a $YC_RC_B$ color model. In a color model, a three-dimensional Cartesian coordinate system (x, y, z) is used to specify individual colors within a specific gamut of colors. The RGB model is commonly used to define the gamut of colors that can be displayed on an LCD or CRT, while image data is commonly represented according to an $YC_RC_B$ model before being subjected to a compression method. In the RGB model, each primary color—red, green, and blue—represents an axis and the primary colors are added together to produce the desired color. If a 24-bit word is used to define a pixel, three bytes (8 bits), one for each primary color, are concatenated to form the binary value used to define a pixel. According to the 24-bit $YC_RC_B$ color model, 8 bits define a Y (brightness) value and 8 bits each define $C_R$ (chrominance-red) and $C_B$ (chrominance-blue) color difference values.

Figure 2:
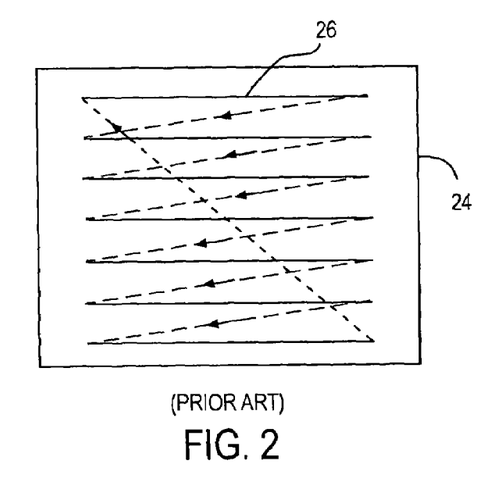
FIG. 2 is a front side view of a raster scan pattern on a display device.

FIG. 2 illustrates a raster scan pattern on a display device 24. Pixels in a display device 24 are generally updated or "refreshed" according to a raster scan pattern. Beginning with the left-most pixel on the top scan line 26 of the array, pixels in the display device 24 are updated pixel-by-pixel from left to right. After all of the pixels in the top line have been refreshed, the pixels in the second line from the top of the array are updated, again beginning with the left-most pixel. The raster scan pattern continues to each successively lower line until all of the lines in the array have been updated.

Each array of pixels is typically referred to as a frame. Because the pixels in a frame are displayed in raster sequence, it is common to store the pixels in memory in raster sequence. In addition, when a frame is transmitted between or within components a computer system, frequently a raster stream of pixels is what is transferred. Thus, the row and column coordinate position of a pixel in a display device can often be determined based its relative position in a memory or within a stream of data. In contrast, data that is stored or streamed as JPEG decoded block-interleaved data is not in raster sequence, as explained below.

Figure 3:
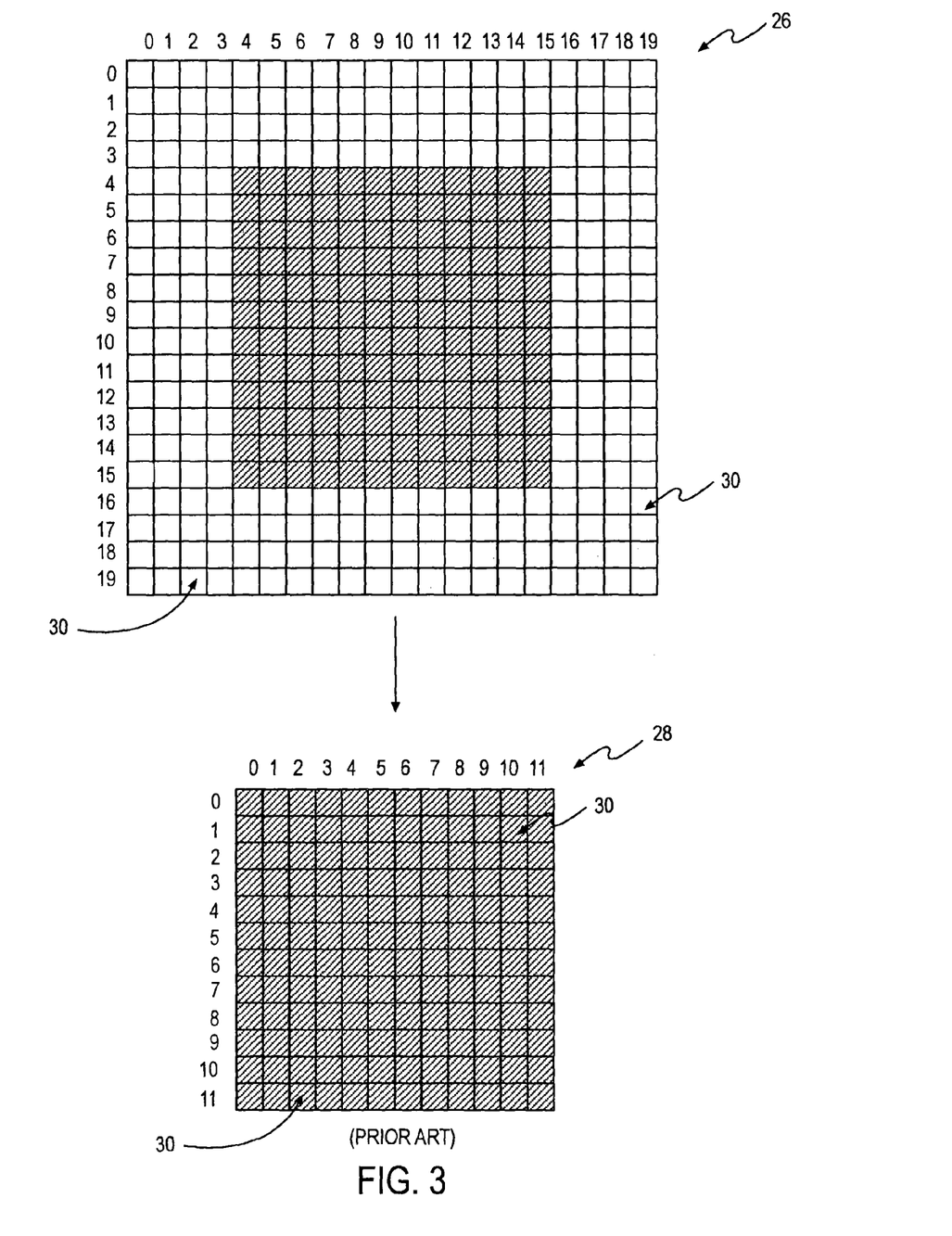
FIG. 3 is a front side view of an original and a cropped frame.

As shown in FIG. 3, one operation that may be performed on a frame before it is displayed on a display device is a cropping operation. An original frame 26 and a cropped frame 28 are illustrated in FIG. 3. Each frame comprises a plurality of pixels 30, each pixel being represented by a square. The coordinate position of a particular pixel 30 is given by the numbers along the top and left side of the frame. The amount by which an image is cropped is determined by a set of cropping parameters. Specifically, the cropping parameters define which areas are to be removed from the original frame 26 and may be specified in terms of coordinate values. For example, the cropping parameters may be start and stop pixels in the horizontal and vertical directions. For instance, if in the original frame 26 a distance equal to a four pixels is to be removed from the top, bottom, and each side of the frame, the coordinates of the start pixel are (4, 4) and that of the stop pixel are (15, 15).

Figure 4:
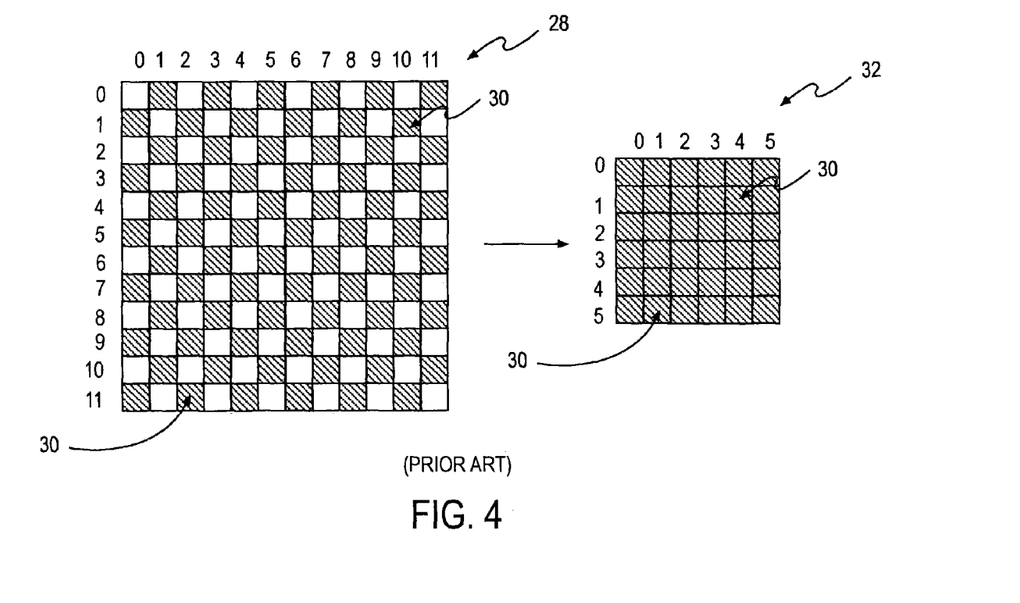
FIG. 4 is a front side view of the cropped frame of FIG. 3 and a scaled frame.

FIG. 4 illustrates another operation that may be performed on a frame before it is displayed on a display device 24, in particular, FIG. 4 shows a scaling operation. The amount by which an image is scaled is determined by a scale factor. For example, if the cropped frame 28 is to be reduced to one-fourth its original size, the scale factor is one-half. An image may be scaled using any one of a number of algorithms. When an image is scaled according to a simple linear algorithm using a scale factor of one-half, every other row of pixels 30 is discarded and every other pixel within a row is discarded. Scaling the cropped frame 28 using this linear algorithm and a scale factor of one-half produces the cropped and scaled frame 32. To illustrate the mapping of rows of pixels 30 and pixels within rows that are not discarded, FIG. 4 also shows the coordinates of two exemplary pixels ([1,10] and [11,2]) in frame 28 and the location of these pixels in the scaled frame 32.

Figure 5:
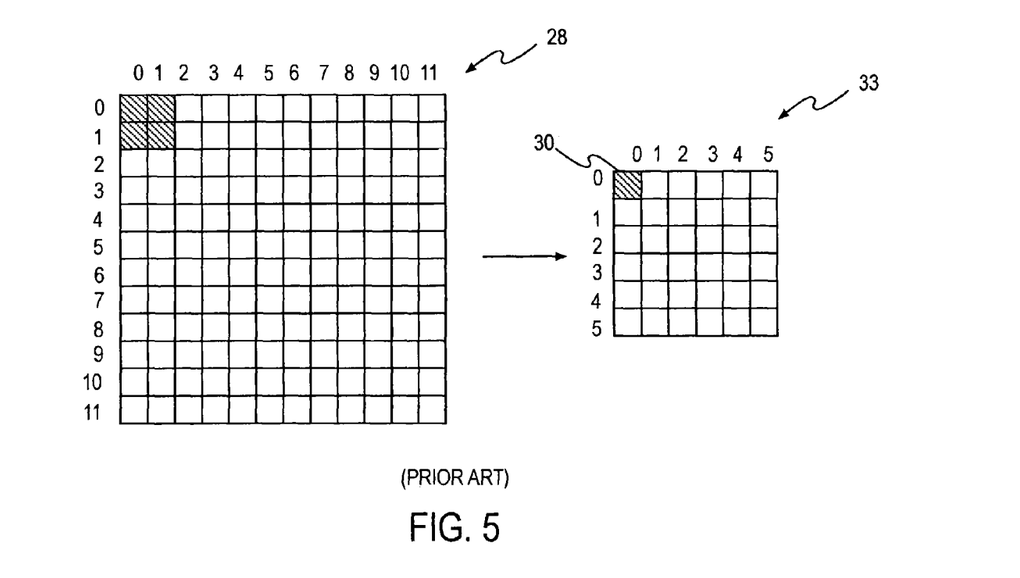
FIG. 5 is a front side view of the cropped frame of FIG. 3 and an alternative scaled frame.

As mentioned, an image may be scaled using any one of a number of scaling algorithms. While the simple linear algorithm described above discards pixels, not all algorithms have this property. FIG. 5 illustrates another method by which the cropped frame 28 may be scaled before it is displayed on a display device. Like FIG. 4, FIG. 5 shows the cropped frame 28 and a scaled frame 33, which is one quarter of the size of the cropped frame. Unlike the scaled frame 32 of FIG. 4, which is generated by a simple linear algorithm, the scaled frame 33 of FIG. 5 is generated using an algorithm that does not discard any pixels 30 in the cropped ("original") frame 28, nor does it directly use any of the pixels in the original frame. The numeric value defining the attributes of each pixel 30 in the scaled frame 33 is generated by computing an average value of four pixels in the original frame 28 which is then used for each scaled pixel in the scaled frame 33. For example, the pixels 30 in the original frame 28 having coordinates (0, 0), (0, 1), (1, 0), and (1, 1) are summed, the sum is divided by four, and the quotient is assigned as the value of a pixel 30 having coordinates (0, 0) in the scaled frame 33. A value for each pixel 30 in the scaled frame 33 is computed in a similar manner. It will be appreciated that other algorithms may be used to scale an original frame.

The phrase "dimensional transform" is used herein to refer operations that change the size of a frame either by cropping the frame, scaling it, or both. The term is intended to include any algorithm for cropping, scaling, and other similar operations that are now known or later become known in the art.

Figure 6:
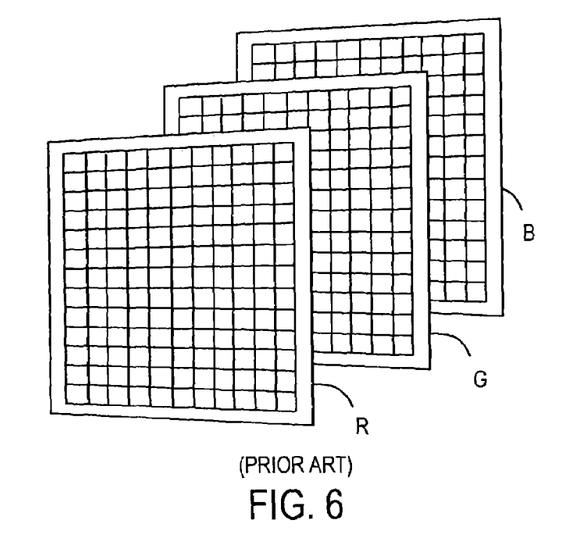
FIG. 6 is a perspective view of a frame as a set of pixel planes.

FIG. 6 shows an alternate view of a frame of pixels that is believed to be helpful for understanding the context of the invention. As mentioned, the numeric value defining the attributes of an RGB pixel on a display device can be represented by a 3-byte word, one byte representing each color component. In FIG. 6, three "frames" of pixel components are shown, that is, all of the R components of the pixels are shown at their respective coordinate locations in an R frame, all of the G components are shown in a G frame, and all of the B components are shown in a B frame. Component images such as those shown in FIG. 6 are sometimes referred to as "pixel planes." Similar pixel planes may be formed with images represented in other color models.

Figure 7:
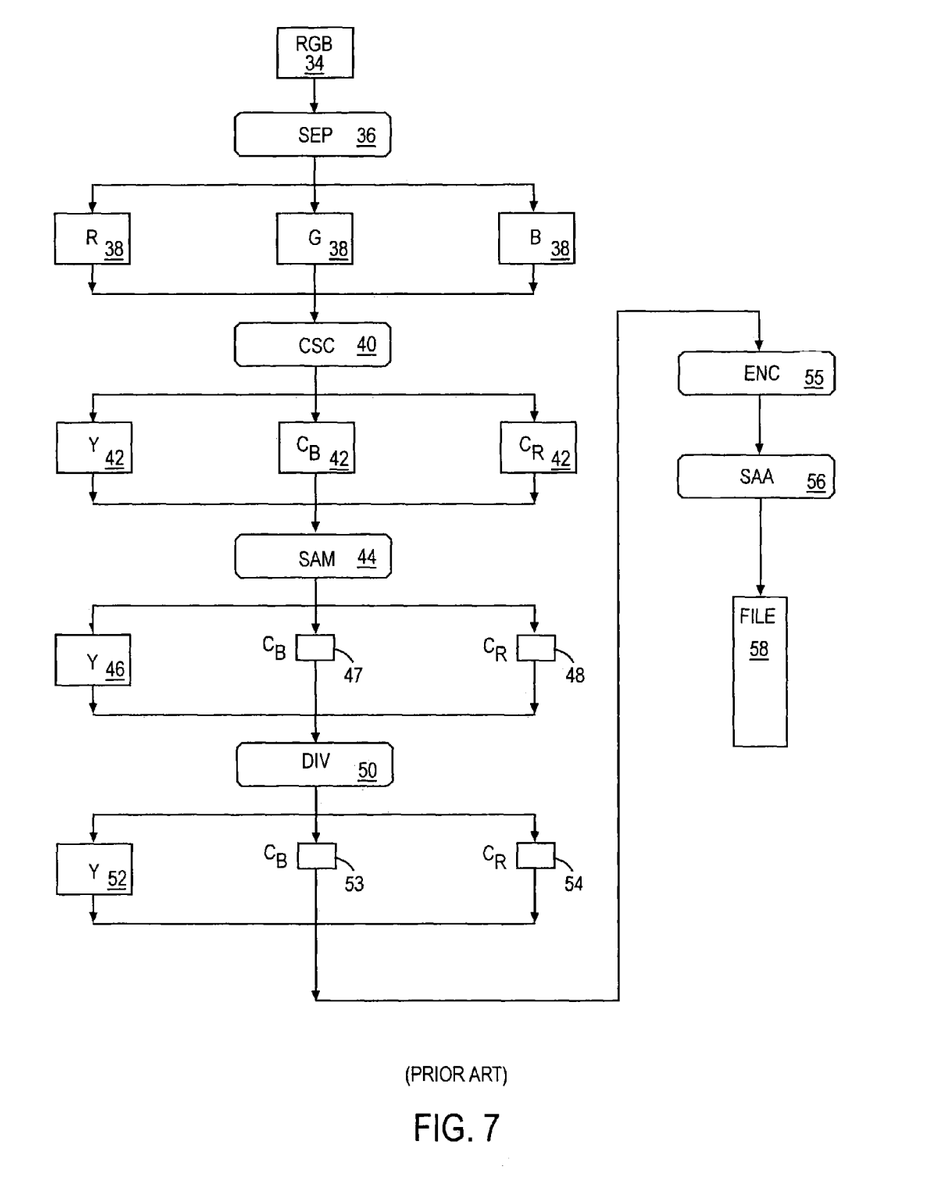
FIG. 7 is a block diagram illustrating the creation of a JPEG file.

With the background provided by way of FIGS. 1-6 in mind, the creation of a JPEG file is illustrated in FIG. 7. The creation of a JPEG file is a complex process and the discussion here is not exhaustive; rather, it is limited to the aspects of the process that are believed to be most important to understanding the context of the invention. Generally, the creation of a JPEG file begins with an RGB image 34 having a size, for example, of 64×48 pixels. FIG. 7 illustrates a first step 36 ("SEP") of separating the RGB image into R, G, and B component images 38 or pixel planes. The component images 38 correspond to the pixel planes of FIG. 6 and one pixel plane 38 is created for each of the primary color components. The second step 40 ("CSC") converts the R, G, and B pixel planes 38 into Y, $C_R$, and $C_B$ pixel planes 42. In a step 44 ("SAM") of sampling, as further explained below, the Y, $C_R$ and $C_B$ pixel planes 42 are sampled.

The pixel planes 42 may be sampled in any number of ways and the particular sampling method is sometimes referred to as the "sampling format." A sampling format defines how groups of four consecutive pixels are sampled and can be specified as $N_Y:N_{CR}:N_{CB}$. For instance, if the sampling format is 4:4:4, then in each group of four consecutive pixels, four each of the Y, $C_R$, and $C_B$ components are sampled, respectively, from the Y, $C_R$, and $C_B$ pixel planes. In other words, the 4:4:4 sampling format results in the sampling of one hundred percent of the pixel components. If the sampling format is 4:2:2, one hundred percent of the pixel components of the Y components are sampled, but only fifty percent of the $C_R$, and $C_B$ components are sampled.

Figure 8:
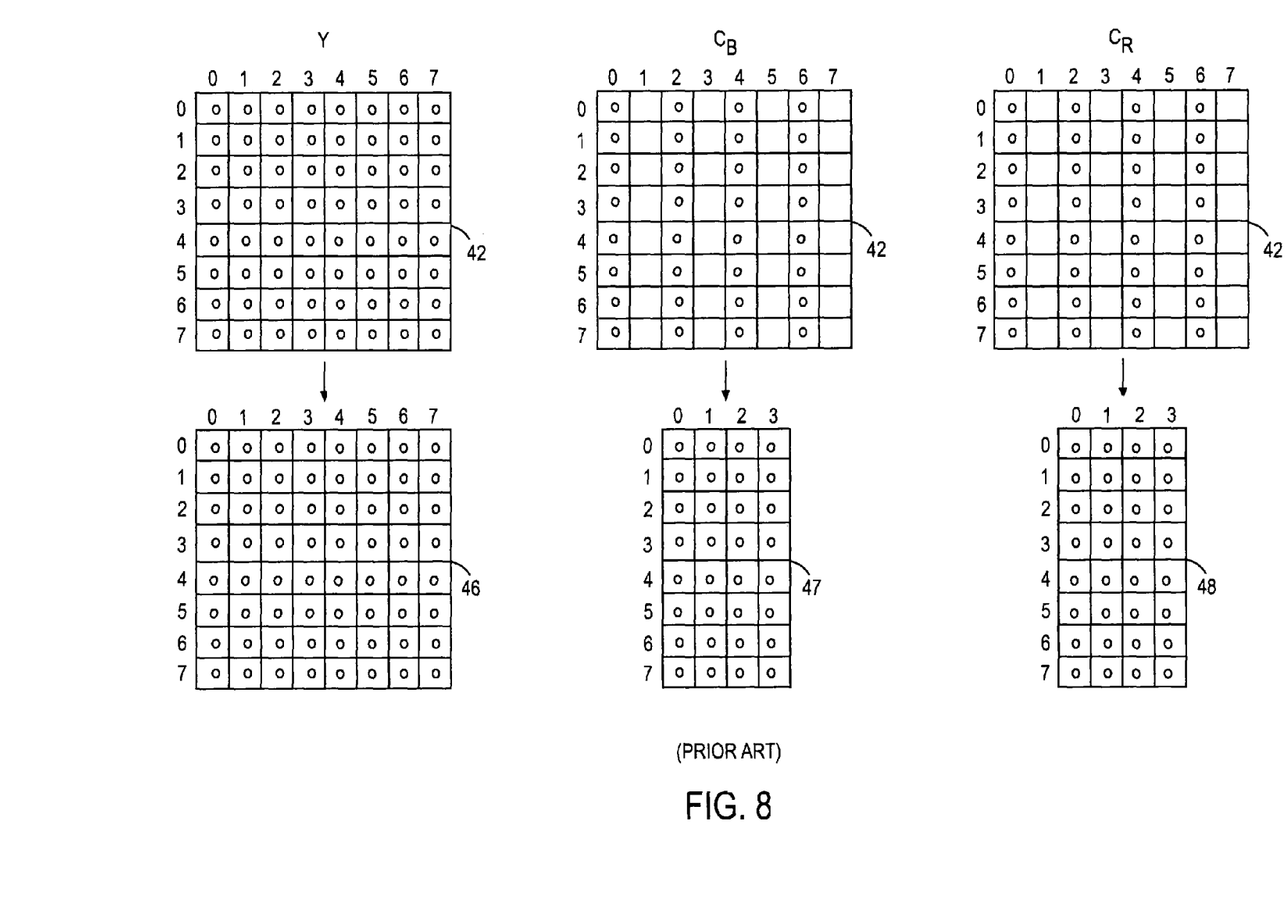
FIG. 8 is a front side view of a set of pixel planes illustrating a step of sampling.

The sampling of step 44 is further illustrated in FIG. 8. The shown sampling format is a 4:2:2 sampling format. FIG. 8 shows "original" Y, $C_R$, and $C_B$ pixel planes 42 before sampling, and Y, $C_R$, and $C_B$ pixel planes 46, 47, and 48 that result from sampling. Let the pixel components in the first row of each pixel plane 42 be numbered P0, P1, P2, P3, P4, P5, P6, and P7. In addition, let each pixel be represented by a square and let each sampled pixel be indicated by a circle within the square. Each row thus consists of two groups four consecutive pixel components. In the Y pixel plane 42 all of the components in each group are sampled. In the $C_R$, and $C_B$ pixel planes 42 however, only the pixel components P0 and P2 are sampled in the first group of four, and only P4 and P6 are sampled in the second group. The Y, $C_R$, and $C_B$ pixel planes 46, 47, and 48 show the results of sampling the entire Y, $C_R$, and $C_B$ pixel planes 42 using the 4:2:2 sampling format.

Notice that the sampled $C_R$ and $C_B$ pixel planes 47 and 48 are one-half the size of pixel component blocks 42. Sampling prior to compression reduces the size of the file representing the frame. Because sampling discards some of the information in the original frame, the discarded information is lost and cannot be recovered. Thus, when a sampled frame is to be displayed, some means must be employed to estimate values for the discarded information. For instance, a sampled pixel component $C_B$ or $C_R$, for P0 may be used for both P0 and the next consecutive pixel P1.

If a 4:1:1 sampling format is employed, only the pixel components P0 and P4 are sampled from each group of four in the $C_R$ and $C_B$ planes 48, while again all of the pixel components would be sampled from the Y block 48. It will also be appreciated by one skilled in the art that other pixels in a group of four may be sampled, such as P1 and P3 in the 4:2:2 sampling format. The 4:2:2 sampling format is exemplary; other sampling formats are possible, such as the 4:4:4 or 4:1:1 formats.

As mentioned, FIG. 8 illustrates the sampling of the Y, $C_R$, and $C_B$ pixel planes 42 in a step 44. For purposes of illustration, the sampling in FIG. 7 employs the 4:2:2 sampling format, that is, the sampling that occurs in the step 44 is the same as that shown in FIG. 8, except that the pixel planes 42 are larger than the 8×8 pixel planes 48. As a result of the step 44 of sampling, the sampled Y, $C_R$ and $C_B$ pixel planes 46, 47, and 48, respectively, are created. In a step 50 ("DIV"), each of the sampled Y, $C_R$, and $C_B$ pixel planes 46, 47, and 48 are divided into blocks that are, preferably, 8×8 pixel blocks. The block-divided pixel planes are numbered 52, 53, and 54, and shown in greater detail in FIG. 9.

Figure 9:
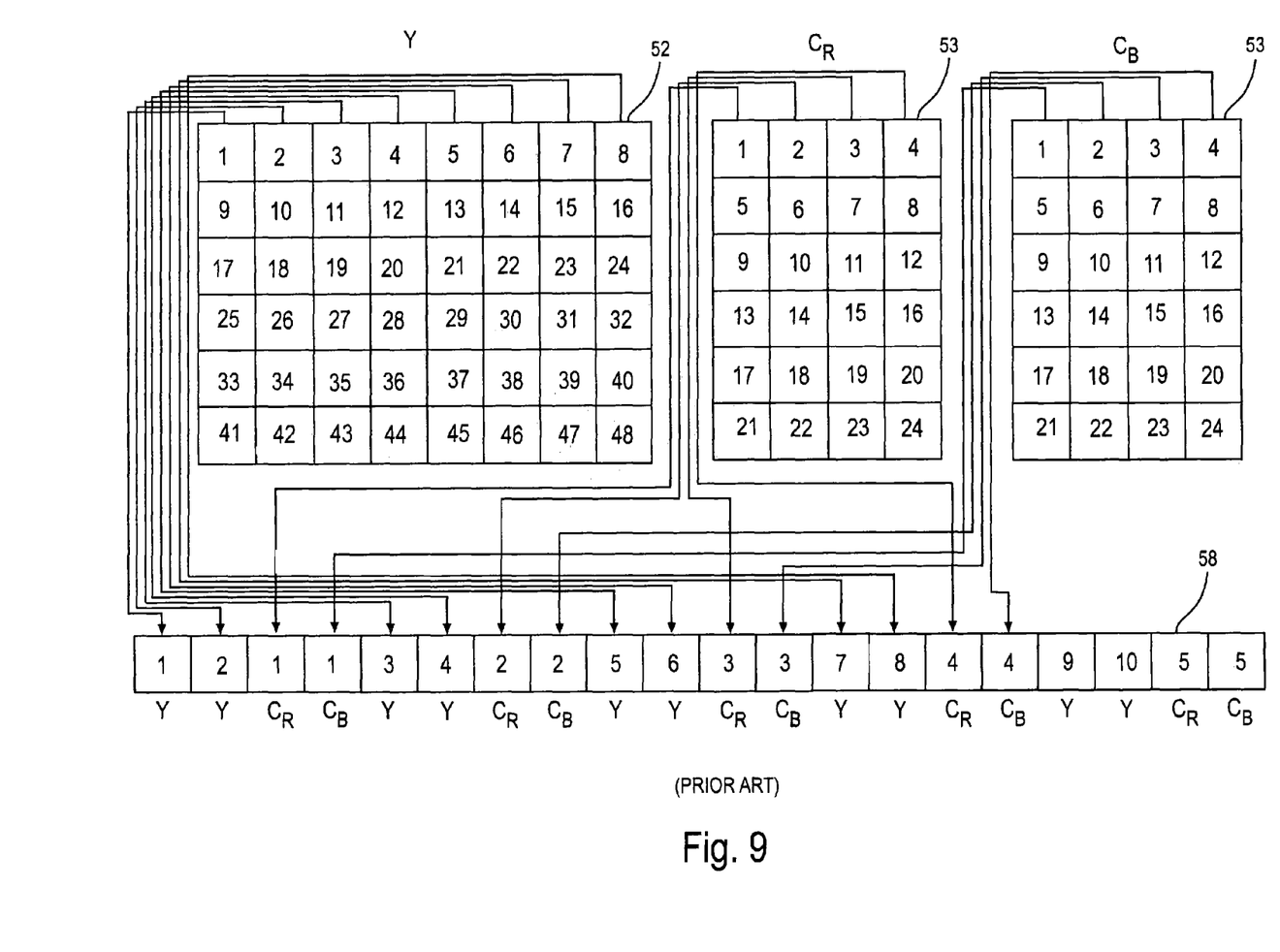
FIG. 9 is a set of sampled and block-divided pixel planes and a portion of a block-interleaved JPEG file.

In FIG. 9, the block-divided pixel plane 52 is a 64×48 pixel plane consisting of forty-eight blocks (8×6), formed by block-dividing pixel plane 46. Each block comprises an 8×8 matrix of pixels. Similarly, pixel planes 53 and 54 are 32×48 pixel planes consisting of twenty-four blocks (4×6), formed by block-dividing pixel planes 47 and 48, respectively.

Referring again to FIG. 7, each block is JPEG encoded in a step 55 ("ENC"), that is, each block is separately compressed according to a JPEG method. In a step 56 ("SAA"), compressed blocks of pixel components are selected and arranged into a JPEG file 58, part of which is shown in greater detail in FIG. 9. Various markers (not shown) are inserted into the JPEG file 58 to indicate data boundaries. The JPEG file 58 is said to be in a "block-interleaved format," as explained further below.

As shown in FIG. 9, the JPEG file 58 consists of blocks from the pixel planes 52, 53, and 54 arranged in a regular pattern. Specifically, the JPEG file 58 consists of two sequential blocks from the Y pixel plane 52, followed by one block from each of the $C_R$ and $C_B$ pixel planes 53, 54. This pattern is repeated until all of the blocks from all of the planes have been selected. FIG. 9 illustrates how the blocks are interleaved when a 4:2:2 sampling format is employed. It will be appreciated that if a different sampling format is used, the block-interleaved format will be modified accordingly.

Figure 10:
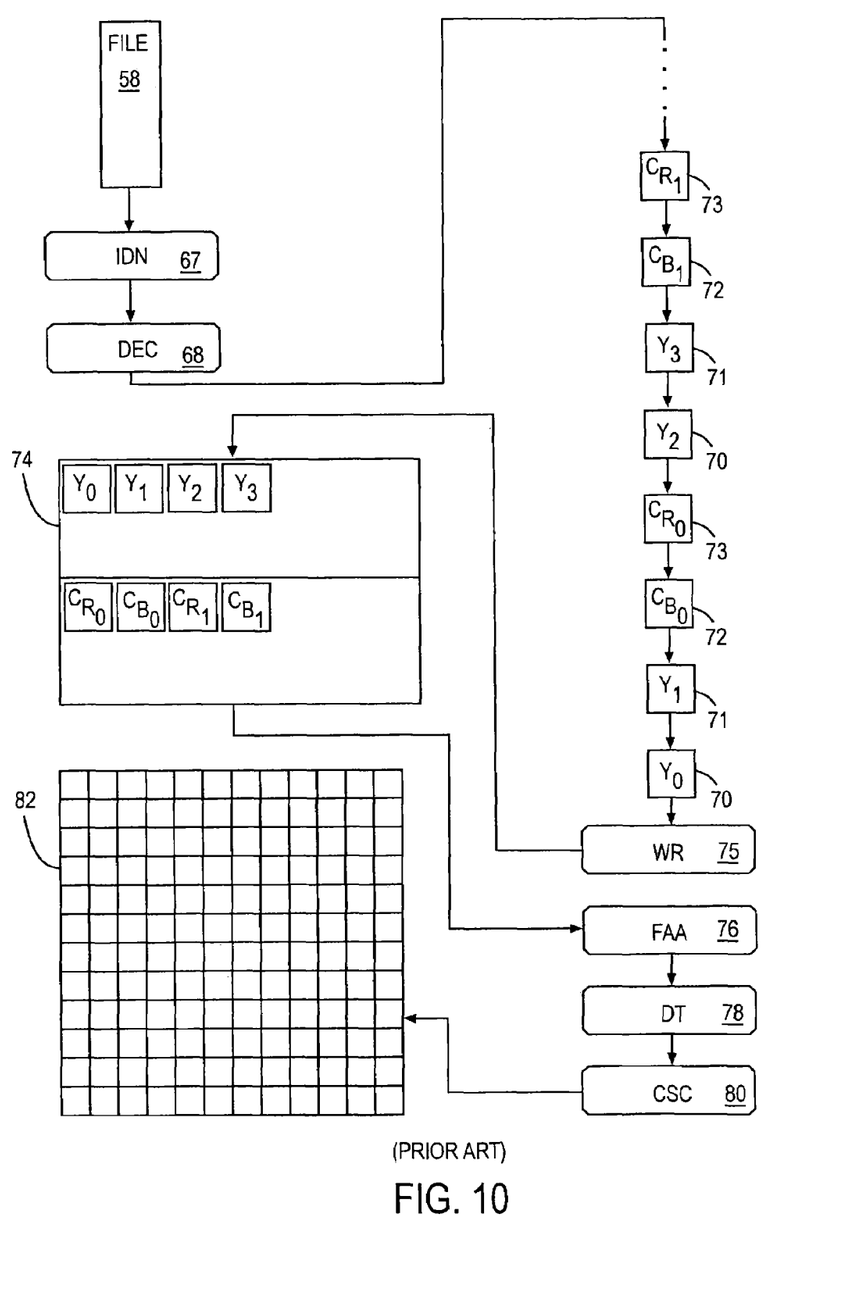
FIG. 10 is a block diagram illustrating the preparation of a JPEG file for display.

FIG. 10 illustrates how a JPEG file 58 is decompressed and processed for display on a display device. The JPEG file 58 shown in FIG. 10 may be a stream of data that is received over a network or a stream of data retrieved from a memory. In a step 67 ("IDN"), each block of compressed data is identified, and in a step 68 ("DEC"), each encoded block of data is decompressed, preferably using a CODEC. Representative blocks of Y, $C_R$, and $C_B$ pixel components 70-73 are shown as output in the sequence in which they are decompressed. The shown blocks of pixel components are only a small part of the JPEG file. Further, it will be appreciated by one skilled in the art that the shown blocks 70-73 represent, for a 4:2:2 sampling format, a minimum coded unit or "MCU." It will also be appreciated that the blocks 70-73, as well as the entire decompressed JPEG file, is in block-interleaved format. Because the decompressed JPEG file is not in raster format and is not comprised of pixels, but rather pixel components, there is a need for the JPEG file to be reordered into the correct format for scanning to a display device, that is, the decompressed JPEG file needs to be assembled into a raster sequence of pixels.

In a step 75 ("WR"), the pixel component blocks 70-73 are identified by type and written to an area of a line buffer 74 that is reserved for blocks of that type. FIG. 10 shows that the Y pixel blocks 70, 71 are written to the top half of the line buffer 74 and the $C_R$ and $C_B$ pixel blocks 72, 73 are written to the bottom half. The line buffer 74 is a memory that is large enough to hold enough blocks to form two lines of pixels in the display device, that is, for 4:2:2 sampling, the line buffer must be large enough to store four rows of blocks. In the example, eight blocks of Y and four blocks each $C_R$ and $C_B$ of are required for one line. The reason for the size requirement is that the circuit that performs the dimensional transform of the frame requires a full line of pixels, and the only way a full line can be provided is by providing all of the blocks that hold the line. In addition, while the dimensional transform circuit is reading one row of blocks, there must be space in the line buffer 74 for storing the next row of blocks.

The individual pixel components that correspond to a particular pixel are fetched from their respective locations in the line buffer 74 and assembled into pixels in a step 76 ("FAA"). In step 76, pixels are not fetched sequentially from the line buffer, but are fetched in a particular order. Specifically, pixel components are fetched in step 76 in raster sequence so that when they are transferred to the next processing step as assembled pixels they will be in raster order. Dimensional transform operations, such as cropping and scaling, are performed on the assembled pixels in a step 78 ("DT"). Because the pixels received in step 78 are in raster sequence, the row and column coordinate position in the display device of each pixel is implicitly known, and this information is used by the dimensional transform algorithms employed in step 78. In a step 80 ("CSC"), the pixels are converted from the $YC_RC_B$ to the RGB color model and written to a frame buffer memory 82. The pixels in the frame buffer 82 are in RGB format and raster sequence as required by a display device.

Figure 11:
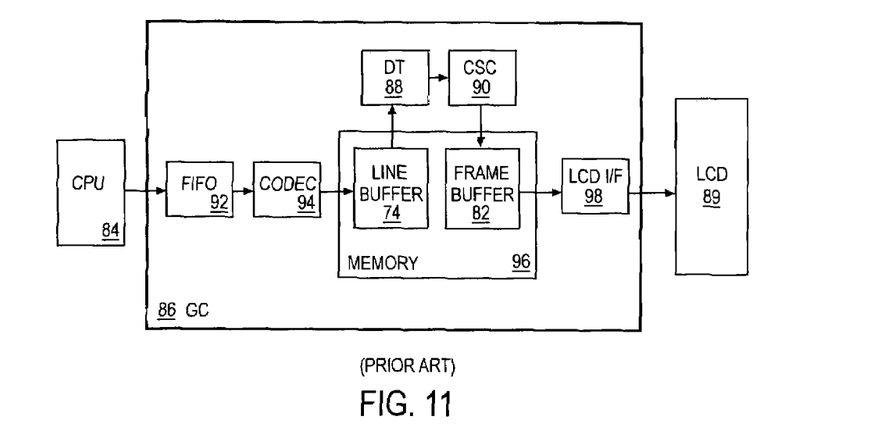
FIG. 11 is a block diagram of a computer system for decompressing and displaying a JPEG file.

FIG. 11 shows a computer system for decompressing and displaying an image represented by a JPEG file 58. The computer system includes a CPU 84, a GC 86, and an LCD 89. The GC 86 includes a known dimensional transform circuit 88 and a color space conversion circuit 90. In FIG. 11, the CPU 84 writes a JPEG file 58 to a FIFO memory 92, which is used for buffering purposes. From the FIFO 92, the JPEG file 58 is sent to a CODEC 94. The shown GC 86 includes an embedded memory 96. A part of the memory 96 is set aside as a line buffer and another part is set aside as a frame buffer 82. The CODEC 94 decompresses the JPEG file 58 and writes its output to the line buffer 74. The dimensional transform circuit 88 reads pixel components from the component blocks stored in the line buffer 74. The dimensional transform circuit 88 does not read the pixel components sequentially, but reads them in raster sequence. The dimensional transform circuit 88 assembles the pixel components into pixels and, after performing any desired dimensional transform operations, such as cropping or scaling, sends the pixels to the color space conversion circuit 90. The color space conversion circuit 90 converts the pixels into the RGB format and writes them to the frame buffer 82. An LCD interface circuit 98 reads pixels from the frame buffer 82 and presents them to the LCD 89.

It will be appreciated that a significant amount of memory bandwidth is required to transfer the decompressed JPEG file 58 from the CODEC 94 to the line buffer 74. For example, if the data path to the line buffer is 32 bits wide, if the 4:2:2 sampling format was used during compression, and if each pixel component requires 8 bits, then 230,400 write operations are required to transfer a decompressed 640×480 pixel image to the line buffer 74. Further, an additional 230,400 read operations are required for the dimensional transform circuit 88 to read the file from the line buffer 74. Thus, a total of 460,800 read/write operations are required to transfer the decompressed image data from the CODEC 94 to the dimensional transform circuit 88. The high memory bandwidth required increases power consumption. Clearly, any reduction in the amount of memory bandwidth required for this operation would be desirable.

Figure 12:
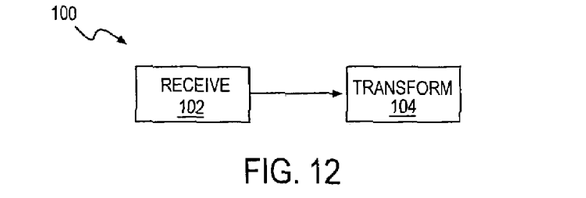
FIG. 12 is a flow diagram of a method for reducing the bandwidth required to transmit image data to a display device according to the invention

FIG. 12 shows a preferred embodiment of a method 100 for reducing the bandwidth required to transmit JPEG decoded block-interleaved data according to the invention. For the purpose of illustrating the method 100, it is assumed that each pixel is represented numerically by three bytes, one for each of three color components. However, it will be appreciated that a pixel may be represented by more or fewer components and that the unit which represents a component need not be an 8-bit byte, but may be represented by any number of bits. In a step 102 ("RECEIVE"), image data is received from a CODEC as a stream of data elements. Preferably, each data element is a byte representing one of the plurality of pixel components necessary to define a pixel, for example, one of the three: Y, $C_R$, and $C_B$ pixel components. Alternatively, each data element may represent all of the pixel components necessary to define a pixel. In a step 104 ("TRANSFORM"), a dimensional transform operation is performed on the received image data such that some of the image data is selected and stored, and other image data is discarded. Preferably, image data needed to display the image after it has been dimensionally transformed is stored and image data not needed to display the image is discarded. For example, data elements that correspond to cropped portions of the image would be discarded. As another example, data elements that are not represented in a scaled image would be discarded.

Figure 13:
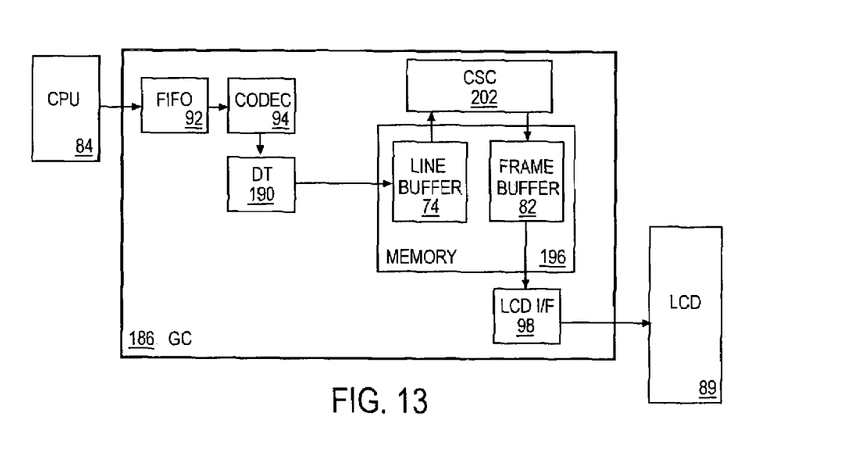
FIG. 13 is a block diagram of a computer system for decompressing and displaying a JPEG file according to the invention.

FIG. 13 illustrates a preferred embodiment of a computer system for reducing the bandwidth required to decompress and transmit a JPEG file 58, and to display an image represented by the file according to the invention. While the JPEG file 58 is in a JPEG format, other file formats are possible. The computer system includes a CPU 84, a GC 186, and an LCD 89. The GC 186 includes a dimensional transform circuit 190 for undersampling JPEG decoded block-interleaved data according to the invention. In addition, the GC 186 includes an embedded memory 196, however, it is not critical that the memory be embedded. In an alternative embodiment, the memory 196 is located off-chip. In FIG. 13, the CPU 84 writes a JPEG file 58 to a FIFO 92, which is used for buffering purposes. From the FIFO 92, the JPEG file 58 is sent to a CODEC 94 where it is decompressed. The CODEC 94 writes the Y, $C_R$, and $C_B$ pixel components in block-interleaved format to the dimensional transform circuit 190. Unlike known dimensional transform circuit 88 which perform dimensional transform operations, on a pixel-by-pixel basis, the dimensional transform circuit 190 performs dimensional transform operations on a pixel-component-by-pixel-component basis.

The dimensional transform circuit 190 circuit includes a receiving module (not shown) which receives the stream of image data. The receiving module includes mapping logic that computes the component type and the (x, y) coordinate value for each pixel component received from the JPEG codec 94. In one preferred embodiment, a byte counter is used to count incoming pixel components, and when the count reaches 64, the circuit recognizes that an entire 8×8 block of components has been received. The dimensional transform circuit 190 also uses the fact that the count has reached 64 to determine that the next component, that is, the 65$^{th}$ byte, will be a component of a different type. In addition, the dimensional transform circuit 190 includes a horizontal counter (not shown) that is used to keep track of x coordinate values and a vertical counter (not shown) that is used to keep track of y coordinate values.

The dimensional transform circuit 190 also includes a dimensional transform module (not shown). The dimensional transform module uses the computed (x, y) coordinate values of each pixel component to perform dimensional transform operations, such as cropping and scaling. The coordinate value of each pixel component is used to determine whether a particular data element in the data stream should be written to the line buffer 74. The computed component type is used to determine where in the line buffer 74 the pixel component should be written. In one embodiment, the Y components are written to the first half of the line buffer 74 and the $C_R$ and $C_B$ component blocks to the second half.

From the line buffer 74, the pixel components are fetched and arranged into pixels by the color space conversion circuit 202 ("CSC"). From the color space conversion circuit 202, the pixels are sent to the frame buffer 82. An LCD interface 98 reads the pixels from the frame buffer 82 and provides them to the LCD 89.

An outstanding feature of the invention is that the amount of memory bandwidth required within a GC can be significantly reduced. This, in turn, reduces power consumption appreciably. The amount by which memory bandwidth will be reduced depends on the degree of cropping and scaling. For example, if an image is scaled by one-half, only ¼$^{th}$ the number of pixels in the original image will appear in the final image. Thus, in comparison to the known apparatus and method, only ¼$^{th}$ of the number of read/write operations required according to the invention.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A method for reducing the transmission requirements of a system for transmitting image data to a display device, the method comprising receiving first image data representing a plurality of first pixels defining an image for display on the display device, the first image data being transmitted in a data stream and being in a predetermined order of pixel components;

creating second image data representing a plurality of second image pixels; and determining if an attribute of a second image pixel is defined by one of the pixel components, wherein the second image data is created by transforming the first image data as it is received by selectively storing some of the pixel components in a memory for access by the display device, a pixel component being selected if a second image pixel is at least partially defined by the pixel component, and discarding other of the pixel components.

2. The method of claim 1, wherein receiving the first image data includes receiving a first pixel component corresponding to a line of the display at a first time, selectively storing includes storing the first pixel component at a second time subsequent to the first time, and receiving further includes receiving a second pixel component corresponding to the line at a third time subsequent to the second time.

3. The method of claim 2, wherein receiving the first image data includes receiving the first and second pixel components consecutively.

4. The method of claim 1, wherein the data stream comprises JPEG decoded block-interleaved data.

5. The method of claim 4, wherein the data stream comprises 4:2:2 block-interleaved data.

6. The method of claim 1, wherein transforming the first image data as it is received includes cropping the image.

7. The method of claim 1, wherein transforming the first image data as it is received includes scaling the image.

8. The method of claim 1, further comprising determining a coordinate location in the image for each pixel component from the respective positions of each of the pixel components in the predetermined order, wherein a second image pixel is determined to be at least partially defined by a pixel component if the coordinate location in the image for the pixel component corresponds with a coordinate location for the second image pixel.

9. An apparatus for reducing requirements for transmitting image data representing a plurality of pixels defining an image, the image data being transmitted in a data stream and being in a predetermined order of pixel components, comprising:

a receiving module to receive the data stream and to compute a coordinate location in the image for each pixel component in the data stream; and a transforming module to transform the image data as it is received by creating second image data representing a plurality of second image pixels, and determining if an attribute of a second image pixel is defined by one of the pixel components, wherein the second image data is created by transforming the first image data as it is received by selectively storing some of the pixel components in a memory for access by a display device, a pixel component being selected if a second image pixel is at least partially defined by the pixel component, and discarding other of the pixel components.

10. The apparatus of claim 9, wherein the receiving module receives a first pixel component corresponding to a line of the image at a first time, the transforming module selectively stores the first pixel component at a second time subsequent to the first time, and the receiving module receives a second pixel component corresponding to the line at a third time subsequent to the second time.

11. The apparatus of claim 9, the receiving module additionally to compute a component type for each pixel component in the data stream, wherein the memory is allocated into two or more portions, and the transforming module selectively stores pixel components of a first type in a first portion of the memory and pixel components of a second type in a second portion of the memory.

12. The apparatus of claim 9, wherein if a pixel of the transformed image data is at least partially defined by a pixel component, the pixel component is selected by the transforming module for storing.

13. The apparatus of claim 12, wherein a pixel of the transformed image data is at least partially defined by a pixel component if the coordinate location in the image for the pixel component corresponds with a coordinate location for the pixel of the transformed image data.

14. The apparatus of claim 9, further comprising an arranging module to fetch selected pixel components from the memory and to arrange the selected pixel components into a pixel of the transformed image data.

15. The apparatus of claim 9, wherein the data stream comprises JPEG decoded block-interleaved data.

16. The apparatus of claim 9, wherein the transforming module crops the image.

17. The apparatus of claim 9, wherein the transforming module scales the image.

18. The apparatus of claim 9, wherein the apparatus is embodied in a graphics controller.

19. A machine-readable medium embodying a program of instructions for execution by a machine to perform a method for reducing the transmission requirements of a system for transmitting image data, the image data representing a plurality of pixels defining an image, the image data being transmitted in a data stream and being in a predetermined order of pixel components, the method comprising:
   receiving first image data from the data stream, the first image data representing a plurality of first pixels defining the image;
   creating second image data representing a plurality of second image pixels; and
   determining if an attribute of second image pixel is defined by one of the pixel components, wherein the second image data is created by transforming the first image data as it is received by selectively storing some of the pixel components in a memory and discarding other of the pixel components, a pixel component being discarded if all of the second image pixels can be defined without the pixel component.

20. The machine-readable medium of claim 19, further comprising fetching selected pixel components from the memory and arranging the selected pixel components into second image pixels.

21. The machine-readable medium of claim 19, wherein if a second image pixel is at least partially defined by a pixel component, the pixel component is selected for storing.

22. The machine-readable medium of claim 19, wherein the data stream comprises JPEG decoded block-interleaved data.

23. The machine-readable medium of claim 19, wherein transforming the image data as it is received includes cropping the image.

24. The machine-readable medium of claim 19, wherein transforming the image data as it is received includes scaling the image.

* * * * *